(12) United States Patent
Hengst et al.

(10) Patent No.: US 7,050,226 B2
(45) Date of Patent: May 23, 2006

(54) PLAY-FREE ROTARY MOUNTING

(75) Inventors: Alfred Hengst, Lahnau (DE); Rolf Speier, Wettenberg (DE)

(73) Assignee: Leica Camera AG, Solms (DE)

( * ) Notice: Subject to any disclaimer, the term of this patent is extended or adjusted under 35 U.S.C. 154(b) by 566 days.

(21) Appl. No.: 10/338,657

(22) Filed: Jan. 9, 2003

(65) Prior Publication Data

US 2003/0137761 A1 Jul. 24, 2003

(30) Foreign Application Priority Data

Jan. 19, 2002 (DE) .............................. 102 01 974

(51) Int. Cl.
*G02B 23/00* (2006.01)

(52) U.S. Cl. ...................... 359/418; 359/407; 384/516

(58) Field of Classification Search ............... 359/407, 359/416, 418; 384/516
See application file for complete search history.

(56) References Cited

U.S. PATENT DOCUMENTS 2,325,623 A * 7/1943 Hugh et al. ................. 384/516
3,615,068 A * 10/1971 Edelstein .................. 248/349.1
5,028,123 A * 7/1991 Watanabe et al. ........... 359/418
6,206,784 B1 * 3/2001 Kato ........................... 464/36

FOREIGN PATENT DOCUMENTS

DE   1 929 815 U    12/1965
DE   35 40 322 A1   5/1987

* cited by examiner

*Primary Examiner*—Mark A. Robinson
(74) *Attorney, Agent, or Firm*—Foley & Lardner LLP

(57) ABSTRACT

A play-free rotary mounting for a drive roll held on stop surfaces in the axial direction on a cylindrical body, wherein V-shaped annular grooves with an opening angle V are provided at least in one of the end faces of the drive roll and the stop surface located opposite them on the body, V-shaped bearing shells with at approximately identical opening angles and approximately identical leg length are inserted into the annular grooves, the vertex diameters of the annular grooves differ from the vertex diameters of the bearing shells. Balls with a diameter matched to the opening width of the bearing shells are inserted into the bearing shells. At least one of the stop surfaces can be adjusted in the axial direction in order to clamp the drive roll in. Instead of different vertex diameters, different opening angles can also be provided for the annular grooves and opening angles for the bearing shells.

19 Claims, 5 Drawing Sheets

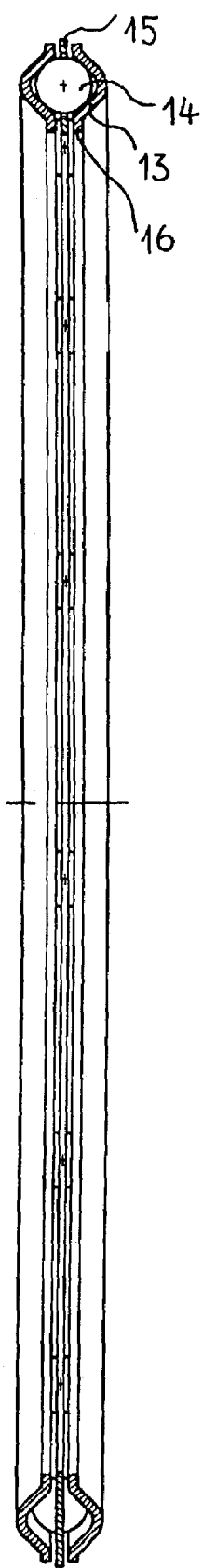
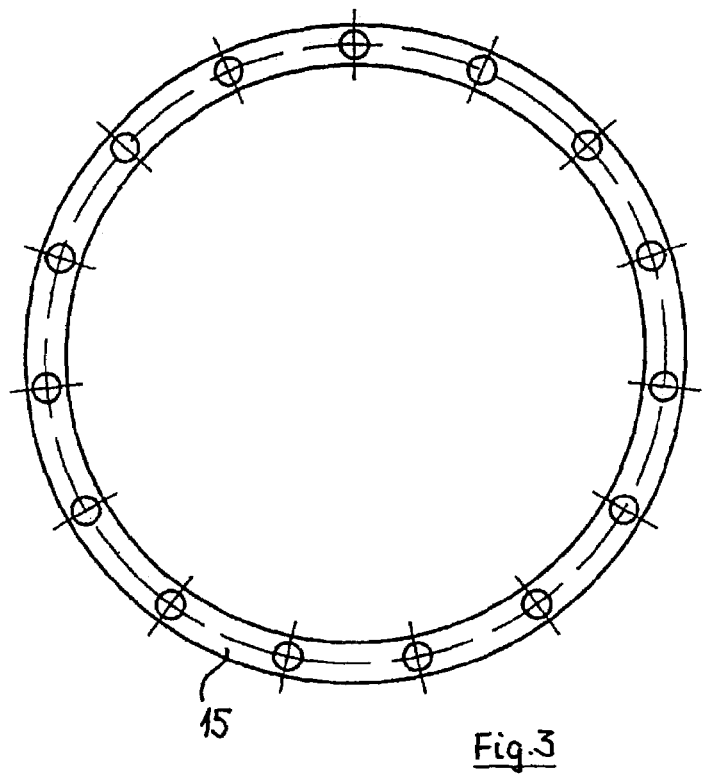
Fig.2
Fig.3

PLAY-FREE ROTARY MOUNTING

CROSS-REFERENCE TO RELATED PATENT APPLICATIONS

Federal Republic of Germany Priority Application 102 01 974.6, filed Jan. 19, 2002 including the specification, drawings, claims and abstract, is incorporated herein by reference in its entirety.

FIELD OF THE INVENTION

The invention relates to a play-free rotary mounting for a drive roll held on stop surfaces in the axial direction on a cylindrical body.

BACKGROUND OF THE INVENTION

In precision instrument making there is often the need to provide rotatable drive rolls with which elements arranged in the interior of a housing can be adjusted. In such cases, the drive roll is intended to be actuated from outside and is fixed so as to limit displacement in the axial direction. Applications of such drive rolls include, for example, adjustment rings on objective lenses and focusing drives on binoculars.

For reasons of space and cost, sliding bearings are normally used for the radial and axial mounting of the drive rolls. In this case, it is known that for sliding bearings to be free-running it is necessary that they exhibit some bearing play, both in the radial and in the axial directions. In contrast, sliding bearings set without play are not free-running and have temperature-dependent and load-dependent torque differences and, as a result, their ability to be adjusted is considerably restricted.

DE 35 40 322 A1 discloses a rolling contact bearing which comprises two concentric bearer rings having approximately V-shaped grooves in the mutually facing outer surfaces. Likewise, V-shaped steel inlays can be inserted into the grooves, and serve as running surfaces for the rolling elements. The rolling elements can be, in particular, rolls arranged crosswise, or balls which can be held by a cage. The opening angle of the groove in the bearer ring can be slightly smaller than that of the inlay. During the assembly of the rolling contact bearing, the inlays are then forced into the corresponding grooves in the bearer rings, over the rolling elements, by means of slight resilient deformation. In this way, a spring-prestressed rolling contact bearing is produced as an installed element which is intended to be particularly advantageous for spasmodic, high-vibration and fast-moving operation.

Parallel to the outer surfaces bearing the grooves, the rolling contact bearing has a central hole to accommodate the axis of rotation of a component to be carried by the rolling contact bearing. The spring prestress of the rolling bodies within the rolling contact bearing is oriented radially with respect to the central hole. Elimination of play of the mounting of the component on the axis of rotation can be achieved only by means of appropriately fitting the holder of the rolling contact bearing in the component and the axis of rotation in the hole in the rolling contact bearing. The rolling contact bearing itself has no influence either on the mounting of the component in the axial direction on the axis of rotation.

DE 1 929 815 U discloses a rolling contact bearing having bearing rings of large diameter which are located on the outside and inside an axis of rotation and offset from one another in the axial direction. Special pressure means, which act on the shoulder of either the outer or inner bearing ring, produce via the rolling elements a permanent prestress with respect to the shoulder of the respective other bearing ring. As a result, the rolling contact bearing is self-adjusting without play in the axial direction and is suitable to accommodate high axial and radial loads and tilting moments. The rolling contact bearing is not adjustable in the radial direction with respect to the axis of rotation.

For the installation of conventional ball bearings, the wall thicknesses available on the housing and in the drive roll are frequently inadequate. In addition, in fine instrument making there is often inadequate space available for the installation of special prestressing means for setting bearing play.

SUMMARY OF THE INVENTION

The invention was therefore based on the object of providing a mounting which can be adjusted absolutely without play, axially and radially, and at the same time run freely for a drive roll for an adjusting mechanism under very restricted space conditions. Additionally, the production costs of the mounting should be as low as possible.

In a rotary mounting of the type mentioned at the beginning, this object is achieved, according to the invention, by the characterizing features of described below. Advantageous refinements emerge from the various alternative embodiments described below.

According to one embodiment of the invention, a play-free rotary mounting for a drive roll (2) held on stop surfaces (10, 11) in the axial direction on a cylindrical body (1) is described. In this embodiment, V-shaped annular grooves (17, 18) with an opening angle V are provided at least in one of the end faces (8, 9) of the drive roll (2) and the stop surface (10, 11) are located opposite them on the body (1). V-shaped bearing shells (13) with at least virtually identical opening angles W and approximately identical leg length are inserted into the annular grooves (17, 18). In this embodiment, the vertex diameters X, Y of the annular grooves (17, 18) differing from the vertex diameters Z of the bearing shells (13). Bearing balls (14) with a diameter matched to the opening width of the bearing shells (13) are inserted into the bearing shells (13). In this embodiment, at least one of the stop surfaces (11) can be adjusted in the axial direction in order to clamp the drive roll (2) in. In one variant of this embodiment, the vertex diameters X, Y of the annular grooves (17, 18) are greater than the vertex diameters Z of the bearing shells (13). In another variant of this embodiment, the vertex diameters X, Y of the annular grooves (17, 18) are smaller than the vertex diameters Z of the bearing shells (13). In yet another variant of this embodiment, the vertex diameter X of one annular groove (17; 18) is greater and the vertex diameter Y of the other annular groove (17; 18) is smaller than the vertex diameter Z of the bearing shells (13). In yet another variant of this embodiment, the opening angles V, W of the v-shaped annular grooves (17, 18) and of the bearing shells (13) are 90°±30°. In yet another variant of this embodiment, the vertex diameters X, Y of the annular grooves (17, 18) differ from the vertex diameters Z of the bearing shells (13) by at least 0.2% and at most 0.8%.

According to another embodiment of the invention, a play-free rotary mounting for a drive roll (2) held on stop surfaces (10, 11) in the axial direction on a cylindrical body (1) is described. In this embodiment, V-shaped annular grooves (17, 18) with an opening angle V are provided at least in one of the end faces (8, 9) of the drive roll (2) and the stop surface (10, 11) is located opposite it on the body (1). V-shaped bearing shells (13) with a larger opening angle W and approximately identical leg lengths are inserted into the annular grooves (17, 18). In this embodiment, the vertex diameters X, Y, Z of the annular grooves (17, 18) and of the bearing shells (13) are nearly virtually identical. Bearing balls (14) with a diameter matched to the opening width of the bearing shells (13) are inserted into the bearing shells (13). In this embodiment, at least one of the stop surfaces (11) can be displaced in the axial direction in order to clamp the drive roll (2) in. In a variant of this embodiment, the opening angle W of the bearing shells (13) is at least 0.2% and at most 0.8% greater than the opening angle V of the annular grooves (17, 18). In another variant of this embodiment, this rotary mounting is assigned to both end faces (8, 9) of the drive roll (2). In yet another variant of this embodiment, spacers, such as in the form of a ball cage constructed as an annular disk, are provided between the balls (14). In yet another variant of this embodiment, the bearing shells (13) are made of springy material.

The mutually opposite V-shaped annular grooves can be turned with great precision both in the body and into the end face of a drive roll. The wall thickness of the drive roll in the end face needs to be only a few mm in this case. The likewise V-shaped bearing shells can be produced as simple punched parts. The use of identical top and bottom running surface elements for the balls is cost-effective during production and advantageous during assembly, since no confusion can arise when inserting the bearing shells. As compared with the high precision achieved for the mounting, the production and assembly costs and the necessary space for the mounting overall are viewed as extremely small.

In the event of different vertex diameters for the annular grooves and the bearing shells, the latter in each case bear firmly with only one flank in the associated annular groove. Following insertion of the balls into the bearing shells, the respective free flank of the bearing shell can deform resiliently under the pressure from the balls as the drive roll is clamped in the axial direction. In this case, the free-running ability of the balls is not hampered and, at the same time, any play is removed from the mounting. The means of fixing the drive roll in the axial direction therefore serves at the same time to adjust the play of the mounting. Here, the drive roll is centered in its end mounting and additionally also in the radial direction. If the end faces are mounted on both sides, frictional forces with respect to the cylindrical body can be eliminated.

In the event of identical vertex diameters for the annular grooves and the bearing shells, the bearing shells bear with both flanks on the flanks of the annular groove. Because of the requisite greater opening angle of the bearing shells with respect to the opening angle of the annular grooves, this contact is annular. As the drive roll is clamped in the axial direction, the bearing shells are pressed further into the annular grooves by the pressure of the balls, reducing their opening angle and displacing the bearing ring. This produces likewise a mounting for the drive roll that is free of play, radially and axially, and runs easily.

Owing to the resilient deformability of the bearing shells, no high tight requirements are placed on the fabrication tolerances and on the adjustment accuracies. The diameter, opening angle and other dimensions, whose deviations lie within the context of normal fabrication tolerances, are therefore viewed as unimportant in the context of the invention.

BRIEF DESCRIPTION OF THE DRAWINGS

Exemplary embodiments of the mounting according to the invention are illustrated schematically in the figures and will be described in more detail using the figures, in which:

FIG. 2 shows the system comprising bearing shells and balls;

FIG. 3 shows a ball cage; and

DETAILED DESCRIPTION OF THE PREFERRED EMBODIMENTS

Figure 1:
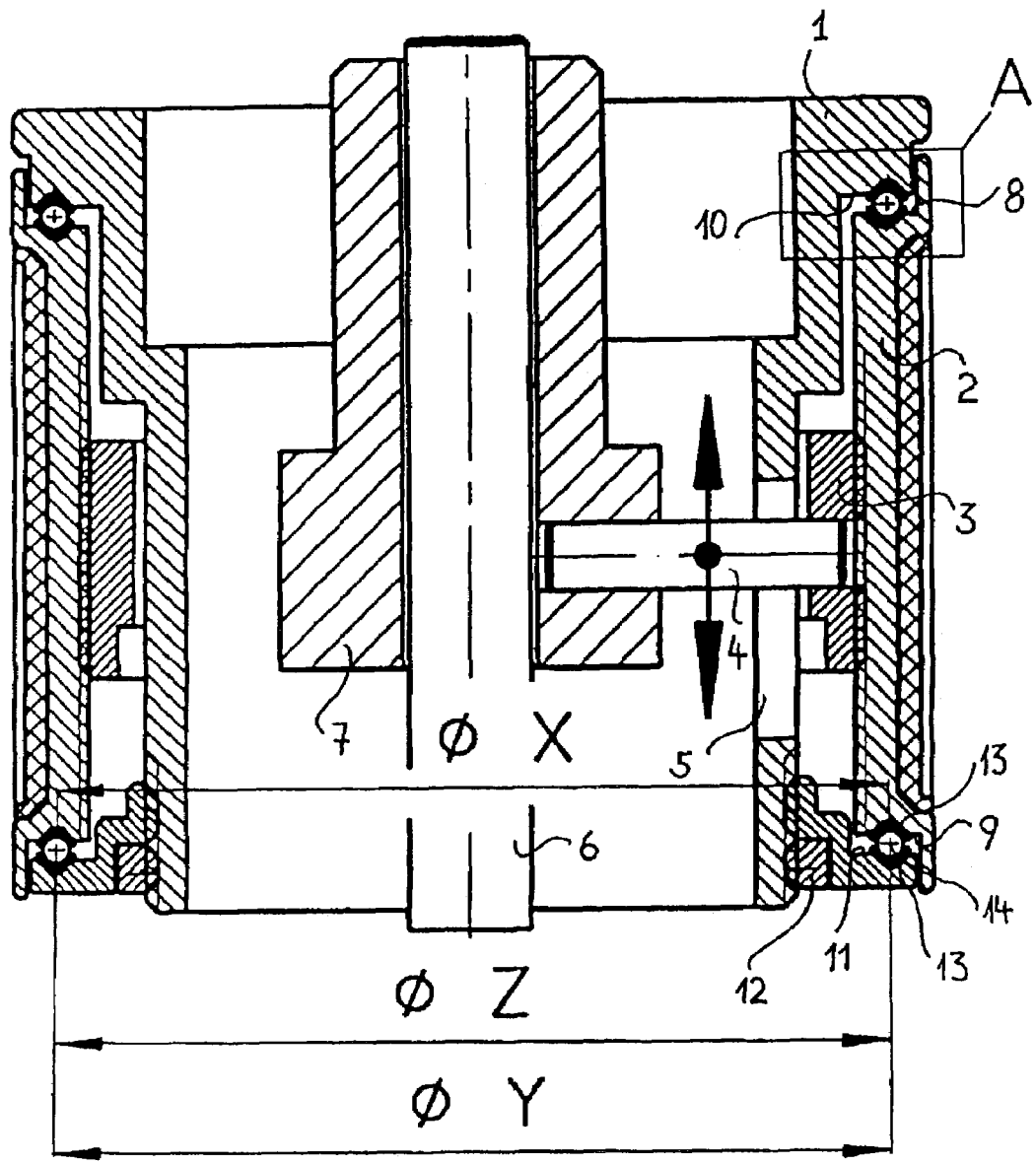
FIG. 1 shows the mounting of a drive knob in the hinge bridge of a pair of binoculars.

In FIG. 1, a drive roll 2 is rotatably mounted on a cylindrical body 1. The body 1 is, for example, part of the hinge bridge of a pair of binoculars, and the drive roll 2 is the drive knob for setting the focus. For this purpose, a screw ring 3 is mounted in a thread in the drive roll 2. Inserted into the screw ring 3 is a pin 4 which is guided in a longitudinal slot 5 in the body 1. A sleeve 7, which is coupled to the pin 4, is mounted such that it can be displaced longitudinally on a stationary shaft 6 belonging to the body 1. In the event of rotation of the drive roll 2, the sleeve 7 is displaced in the direction of the arrow on the shaft 6 in a known way. Adjusting elements, not further shown, belonging to the pair of binoculars, are coupled to the sleeve 7. The transmission of the adjustment forces from the drive roll 2 is to take place without play and without any backlash at the points of reversal. As a result of the mounting of the drive roll 2, no additional frictional forces are to be produced which could hamper the fine feel of the adjustment movement. Additional applications of drive rolls include, for example, adjustment rings on objective lenses and focusing drives on monoculars, cameras, microscopes and other precision optical mountings.

The mounting contained in the detail section A is illustrated more enlarged in FIGS. 4 to 8. From FIG. 1, it can be seen first that the drive roll 2 is held in the axial direction on the body 1 by its upper and lower end faces 8, 9 by mounting opposite stops 10, 11. The stop 11 is screwed onto the body 1 and is used for the play-free adjustment of the mountings. It can be secured such as by a lock nut 12.

FIG. 2 shows, as part of the mounting, the system comprising two bearing shells 13 and balls 14. The balls 14 are expediently held at a distance by a ball cage 15 formed as an annular disk (FIG. 3). However, it is also possible, for example, to use short bent pieces of wire as spacers.

The bearing shells 13 are preferably produced as punched parts and consist of a springy material which, firstly, permits the deformation according to the invention when the drive roll 2 is clamped in and, secondly, does not permit any abrasion nor any running grooves during the running of the balls 14. The edges 16 are angled over with respect to the V-shaped running surfaces which makes handling easier, assists the torsional stability of the punched parts, and permits preassembly with inserted balls 14 if the two bearing shells 13 are held together at the edges 16 by clamps, not shown.

Figure 4:
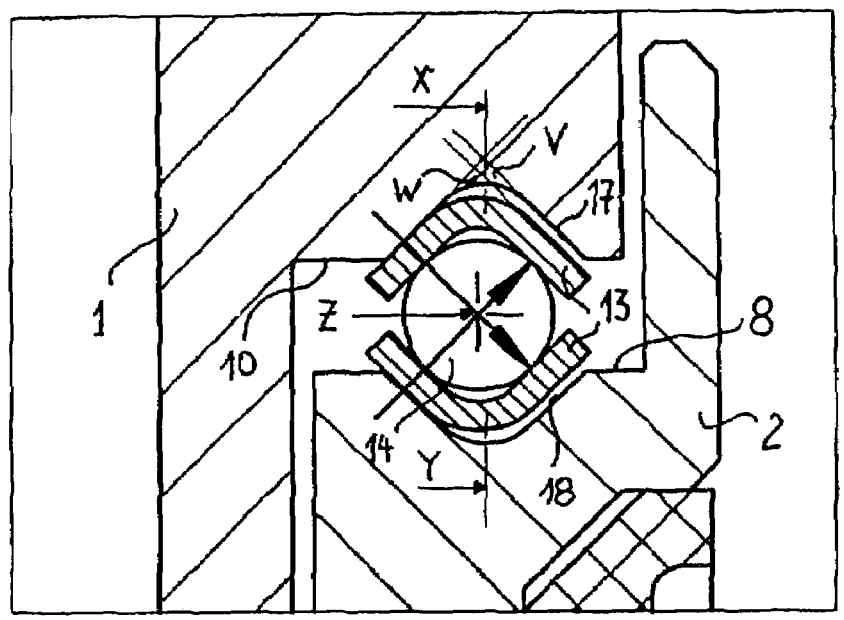
FIGS. 4 to 8 show various embodiments with variation of the vertex diameter and opening angle of the annular grooves and bearing shells.

FIG. 4 shows a first embodiment of the mount. A V-shaped annular groove 17 is turned into the stop 10 on the body 1. Opposite it, a V-shaped annular groove 18 is likewise turned into the end face 8 of the drive roll 2. Both annular grooves 17, 18 have the same opening angle V.

Bearing shells 13 which, in this exemplary embodiment, have the same opening angle W=V, are inserted into the annular grooves 17, 18. The bearing shells 13 are illustrated in FIG. 4 without the edges 16 shown in FIG. 2, since the invention merely concerns positioning the flanks opposite each other in a V shape. The leg length of the flanks on the bearing shells 13 is approximately identical to the leg length of the flanks in the annular grooves 17, 18, in order to ensure that the balls 14 inserted into the bearing shells 13 cannot run in the annular grooves 17, 18. It is therefore possible to select a material for the body 1 and the drive roll 2 completely independently of the material requirements for the running surfaces for the balls 14.

The vertex diameters X, Y of the annular grooves 17, 18 are greater than the vertex diameter Z of the bearing shells 13, initially coinciding with the ball center. Therefore, as the bearing shells 13 are inserted into the annular grooves 17, 18, only the flanks illustrated on the left of the bearing shells 13 and annular grooves 17, 18 bear on one another. The flanks illustrated in FIG. 4 on the right have an air gap between them. When the drive roll 2 is clamped via the screw-in stop 11, the free flanks illustrated on the right of the bearing shells 13 can be deformed resiliently under the influence of the force flows travelling out in the direction of the arrows from the fixed flanks and transmitted by the balls 14. In the process, the ball centers move further to the right and the balls 14 are pressed further into the bearing shells 13. This eliminates play in the bearing, both in the radial and axial directions.

Figure 5:
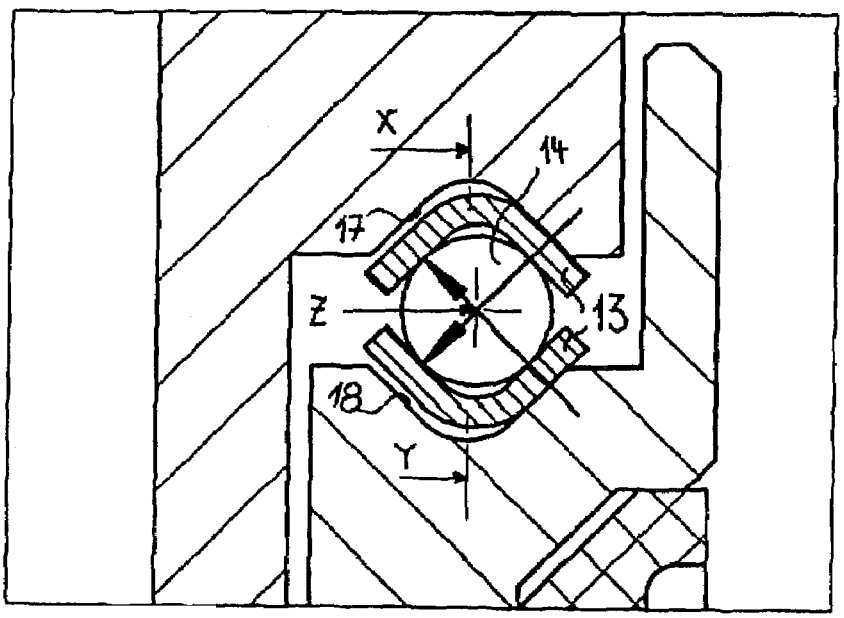

FIG. 5 shows an embodiment in which the vertex diameter X, Y of the annular grooves 17, 18 is smaller than the vertex diameter Z of the bearing shells 13. Otherwise, the same considerations and assumptions as in the aforementioned exemplary embodiment apply.

Figure 6:
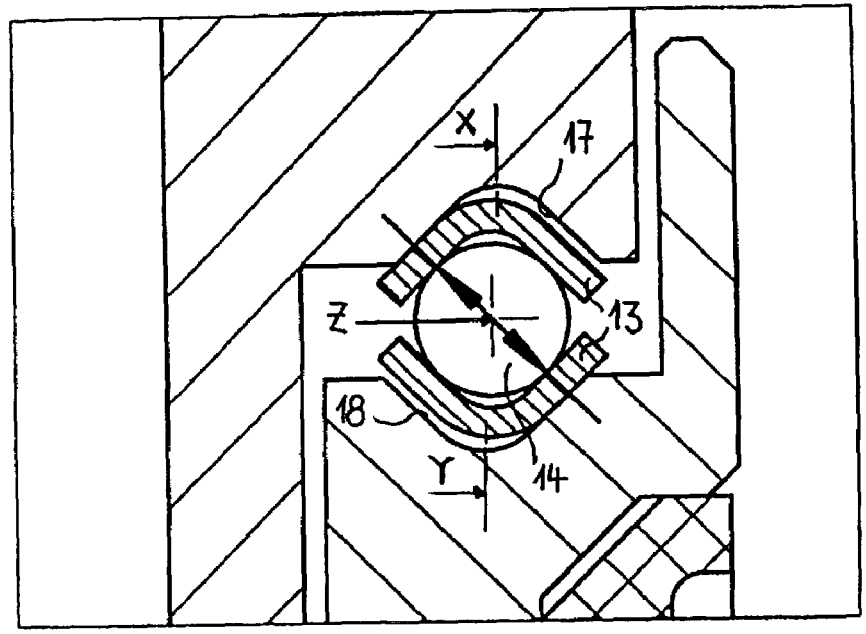
Figure 7:
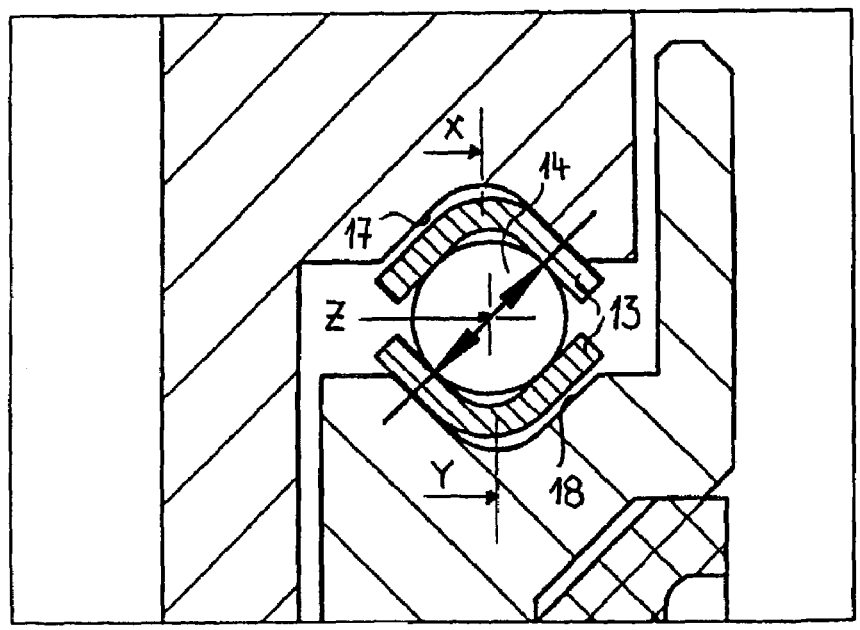

In the exemplary embodiments illustrated in FIGS. 6 and 7, the vertex diameter X of one annular groove 17 is larger or smaller, while the vertex diameter Y of the other annular groove 18 is respectively smaller or larger than the vertex diameter Z of the bearing shells 13. As a result, when the drive roll 2 is clamped in, in each case a diagonal force flow, illustrated by arrows, is produced, by means of which the balls 14 are pressed against the free flanks of the bearing shells 13, likewise located diagonally opposite each other. In this way, freedom from axial and radial play is achieved in these embodiments.

Figure 8:
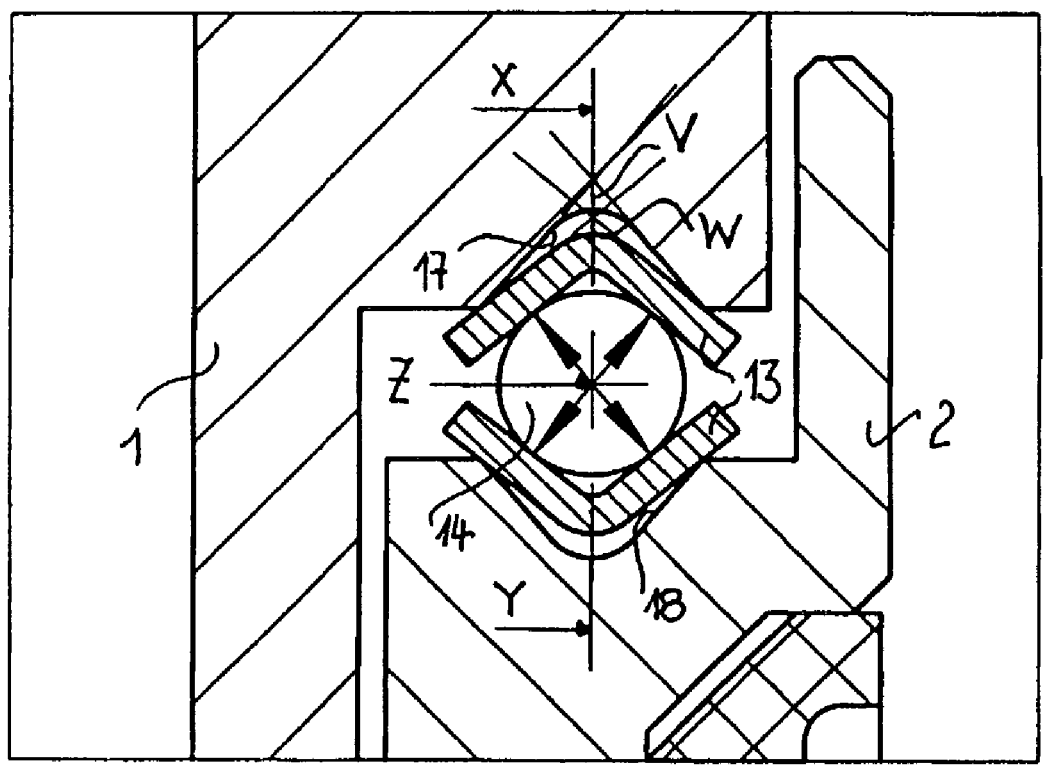

In the exemplary embodiment illustrated in FIG. 8, the vertex diameters X, Y, Z of the annular grooves 17, 18 and bearing shells 13 are identical. In this case, however, the opening angle W of the bearing shells 13 is greater than the opening angle V of the annular grooves 17, 18. When the drive roll 2 is clamped in, under the influence of the force flows crossing in the direction of the arrows, the opening angle W of the bearing shells 13 is reduced as a result of resilient deformation of the flanks as they are pressed into the annular grooves 17, 18. The resilient contact between the bearing shells 13 to a depth on the flanks of the annular grooves 17, 18 which may be different under certain circumstances also effects the freedom from play in the axial and radial direction in this exemplary embodiment.

The common basic principle of the mounting according to the invention is the resilient deformation of the bearing shells 13, either via a free flank of the running surfaces or via the opening angle of the running surfaces, in interaction with the annular grooves 17, 18 that accommodate the bearing shells 13. Irrespective of normal fabrication tolerances, in order to form a deformable flank, the vertex diameters X, Y of the annular grooves 17, 18 should differ from the vertex diameter Z of the bearing shells 13 by at least 0.2% and at most 0.8%. Given equal vertex diameters X, Y, Z of the annular grooves 17, 18 and bearing shells 13, the opening angle W of the bearing shells 13 should be greater than the opening angle V of the annular grooves 17, 18 by at least 0.2% and at most 0.8%.

The ball diameter should be matched to the opening width of the bearing shells 13, in order that, when assembled, a large enough spacing remains between the bearing shells so that the latter do not touch each other, even after the drive roll 2 has been clamped in. In this case, the opening angle of the bearing shells 13 and annular grooves 17, 18 can be 90°±30°.

LIST OF DESIGNATIONS

1 Cylindrical body
2 Drive roll
3 Screw-in ring
4 Pin
5 Longitudinal slot
6 Stationary shaft
7 Sleeve
8, 9 End faces of the drive roll
10, 11 Stops on the body
12 Lock nut
13 Bearing shells
14 Balls
15 Ball cage
16 Edges
17 Annular groove in the body
18 Annular groove in the drive roll

What is claimed is:

1. A play-free rotary mounting for a drive roll having two end faces held on stop surfaces in the axial direction on a cylindrical body comprising:
   a body having a stop surface;
   V-shaped annular grooves with an opening angle and vertex diameters provided at least in one of the end faces of the drive roll and the stop surface located opposite the end faces;
   V-shaped bearing shells having a vertex diameter, an opening angle and an opening width with approximately identical opening angles and approximately identical leg length inserted into the V-shaped annular grooves in at least in one of the end faces and the stop surface, the vertex diameters of the annular grooves differing from the vertex diameters of the V-shaped bearing shells, and
   balls with a diameter matched to the opening width of the bearing shells inserted into the bearing shells
   wherein at least one stop surface can be adjusted in the axial direction in order to clamp the drive roll.

2. The play-free rotary mounting as claimed in claim 1, wherein the vertex diameters of the annular grooves are greater than the vertex diameters of the bearing shells.

3. The play-free rotary mounting as claimed in claim 1, wherein the vertex diameters of the annular grooves are smaller than the vertex diameters of the bearing shells.

4. The play-free rotary mounting as claimed in claim 1, wherein the vertex diameter of one annular groove is greater than the vertex diameter Z of the bearing shells and the vertex diameter of the other annular groove is smaller than the vertex diameter Z of the bearing shells.

5. The play-free rotary mounting as claimed in claim 1, wherein the opening angles of the V-shaped annular grooves and of the bearing shells are 90°±30°.

6. The play-free rotary mounting as claimed in claim 1, wherein the vertex diameters of the annular grooves differ from the vertex diameters of the bearing shells by at least about 0.2 % and at most about 0.8 %.

7. The play-free rotary mounting as claimed in claim 1, wherein rotary mountings are positioned at both end faces of the drive roll.

8. The play-free rotary mounting as claimed in claim 1, further comprising one or more spacers provided between the balls.

9. The play-free rotary mounting as claimed in claim 8, wherein the spacers comprise a ball cage constructed as an annular disk.

10. The play-free rotary mounting as claimed in claim 1, wherein the bearing shells are fabricated of springy material.

11. An annular bearing assembly, comprising:
a first member having an annular V-shaped groove characterized by a vertex diameter and by an opening angle;
a second member having an annular V-shaped groove characterized by a vertex diameter and by an opening angle that is the same as the opening angle of the first member, the first member and the second member being positioned so their respective V-shaped grooves are concentrically aligned facing one another;
a first V-shaped bearing shell positioned within the V-shaped groove of the first member and a second V-shaped bearing shell positioned within the V-shaped groove of the second member, the first and second V-shaped bearing shells being made of a springy material and having approximately equal opening angles and vertex diameters, wherein the vertex diameters of the V-shaped bearing shells are different from the vertex diameters of the V-shaped grooves in the first and second members; and
bearing balls positioned between the first and second V-shaped bearing shells,
wherein the annular bearing assembly is compressed such that the bearing balls elastically deform at least one of the first and second V-shaped bearing shells within the V-shaped grooves of the first and second members, respectively.

12. The annular bearing assembly as claimed in claim 11, wherein the vertex diameters of the V-shaped annular grooves of the first and second members are greater than the vertex diameters of the V-shaped bearing shells.

13. The annular bearing assembly as claimed in claim 11, wherein the vertex diameters of the V-shaped annular grooves are less than the vertex diameters of the V-shaped bearing shells.

14. The annular bearing assembly as claimed in claim 11, wherein the vertex diameter of the V-shaped annular groove in the first member is greater than the vertex diameter of the first and second V-shaped bearing shells and the vertex diameter of the V-shaped annular groove in the second member is less than the vertex diameter of the first and second V-shaped bearing shells.

15. The annular bearing assembly as claimed in claim 11, wherein the opening angles of the V-shaped annular grooves and of the V-shaped bearing shells are 90°±30°.

16. The annular bearing assembly as claimed in claim 11, wherein the vertex diameters of the V-shaped annular grooves differ from the vertex diameters of the bearing shells by at least about 0.2 % and at most about 0.8 %.

17. Binoculars comprising a drive roll for setting the focus, wherein the drive roll comprises an annular bearing assembly according to claim 11.

18. A rotary mounting for use in an optical device comprising an annular bearing assembly according to claim 11.

19. The rotary mounting for use in an optical device according to claim 18, wherein at least one of the first and second members can be displaced in a direction so as to compress the annular bearing assembly.

* * * * *